(12) United States Patent
Acheson et al.

(10) Patent No.: US 11,080,332 B1
(45) Date of Patent: Aug. 3, 2021

(54) FLEXIBLE INDEXING FOR GRAPH DATABASES

(71) Applicant: Amazon Technologies, Inc., Seattle, WA (US)

(72) Inventors: Alazel Acheson, Redmond, WA (US); Mahendra Manshi Chheda, Sammamish, WA (US); Srikanth Mandadi, Redmond, WA (US); Hyun Sik Kim, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 534 days.

(21) Appl. No.: 15/820,227

(22) Filed: Nov. 21, 2017

(51) Int. Cl.
*G06F 16/901* (2019.01)
*G06F 16/23* (2019.01)
*G06F 16/903* (2019.01)

(52) U.S. Cl.
CPC ...... *G06F 16/9024* (2019.01); *G06F 16/2379* (2019.01); *G06F 16/90335* (2019.01)

(58) Field of Classification Search
CPC ............ G06F 16/2237; G06F 16/2246; G06F 16/2264
See application file for complete search history.

(56) References Cited

U.S. PATENT DOCUMENTS

| | | | |
|---|---|---|---|
| 2016/0125093 A1* | 5/2016 | Cho | H04L 65/403 707/798 |
| 2016/0299991 A1* | 10/2016 | Hong | G06F 16/2246 |
| 2018/0081937 A1* | 3/2018 | Broecheler | G06F 16/9024 |
| 2019/0109809 A1* | 4/2019 | Wang | G06F 16/285 |

\* cited by examiner

*Primary Examiner* — Taelor Kim
(74) *Attorney, Agent, or Firm* — Lowenstein Sandler LLP (57) ABSTRACT

A processing device generates an index node for an attribute in a graph database, wherein the index node is linked to a second node by a first edge having a first edge type. The processing device determines a first plurality of additional nodes that have the attribute. For each node of the first plurality of additional nodes, the processing device generates an edge linking the node to the index node, wherein the edge comprises a second edge type.

17 Claims, 8 Drawing Sheets

FLEXIBLE INDEXING FOR GRAPH DATABASES

BACKGROUND

A database may be an organized collection of data. Most databases include a distinct indexing system that is managed in a different manner than content of the databases themselves. For example, in a relational database, an index is a data structure that is attached to a table.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

DETAILED DESCRIPTION

The present disclosure relates to an indexing scheme for a graph database that uses index nodes and index edge types to maintain indexes as nodes in the graph database. A graph database is a database that represents data in graph structures as nodes and edges that connect the nodes. Graph databases may be useful for storage of data in a hierarchical arrangement. The edges may represent relationships between the nodes. Traditionally an index on a database (including indexes on graph databases) are additional data structures that are maintained, updated and operated on using different mechanisms than the contents of the database. As a result, a first set of rules, a first set of operators, a first schema, etc. may be used to manage the database while a second set of rules, a second set of operators, a second schema, etc. may be used to manage indexes of the database. For example, in a relational database an index is a data structure that is attached to a table, and cannot be manipulated in the way that entries in the table can be manipulated.

Additionally, there is generally limited flexibility in the contents of an index. An index may ordinarily be generated for a particular attribute or parameter, but not for a subset of entries, nodes or other objects that include the particular attribute or parameter. For example, an index of a traditional or relational database is generally an index on an every entry in the database or in a table of the database. A standard index for a graph database is an index of every node in the graph database.

Embodiments of the present disclosure include a flexible index node in a graph database. The index node may be managed using the same set of rules, the same set of operators, the same schema, etc. that are used to manage the contents (e.g., other nodes) of a graph database. Accordingly, the index node may be exposed, navigated to and manipulated using standard operators of a graph DBMS. In one embodiment, index nodes are exposed as first class nodes within the graph database, which provides the ability to control what is attached to the index (what is indexed) as well as where the index is located. Since index nodes are first class nodes (also referred to as first class objects), users can create, modify, list and delete index nodes flexibly according to application logic's needs. Additionally, exposing index nodes as nodes in the graph database enables all graph operations to be performed on the index nodes. This may reduce the amount of resources (e.g., processor resources, memory resources and/or storage resources) used for maintaining the index, as the same infrastructure that is used to maintain and operate on the graph database may also be used to maintain and operate on the index nodes. For example, in embodiments there is no need to have separate code that is written, stored and executed to manage and search the index. This reduces an amount of overhead associated with indexes as well as an amount of memory that is used, an amount of storage space that is used and/or an amount of processor utilization that is dedicated to indexes.

Furthermore, the use of index nodes as described herein enables limit models set for a graph database to apply to indexes. This may help to ensure small local queries with low latency. For example, a limit model may limit the amount of operations (e.g., such as read edge operations or list edges operations) that can be performed responsive to a single request. If on an index node exceeds a threshold, then results may be paged, which may include providing an allowed number of results along with a paging token. A second request may then be received along with the paging token to continue the original request.

The index node may be highly configurable. For example, rather than simply indexing all nodes using a particular attribute or set of attributes, the index node may include and exclude arbitrary subsets of nodes from the index. For example, the index node may index only children nodes of a particular node, or only grandchildren nodes of a particular node, or only a particular branch of the graph database, and so on. An administrator may set up arbitrarily complex rules that determine which nodes to include an exclude from an index. An administrator may also attach nodes to and detach nodes to the index node as desired (to cause those nodes to be included in the index). An administrator may also detach nodes from the index node as desired (to cause those nodes to be removed from the index). An index node may index other nodes based on one or more attributes, node type, facet type, or a combination thereof. For example, an index node may index other nodes based on an "email" attribute of a "person" facet. Nodes may be added to and detached from an index node using application programming interface (API) calls. This provides the flexibility to define varying index scopes, and to easily change the scope of an index.

In one embodiment, a graph database management system (graph DBMS) for a graph database receives a first command to create an index for a graph database, the first command comprising an attribute and one or more constraints on nodes to include in the index. The graph DBMS generates an index node in the graph database, wherein the index node is linked to a second node by a first edge having a child edge type. The graph DBMS determines a plurality of additional nodes that a) have the attribute and b) satisfy the one or more constraints. For each node of the plurality of additional nodes, the graph DBMS generates an edge linking the node to the index node, wherein the edge comprises an index edge type and an attribute value of the node for the attribute.

In one embodiment, a graph DBMS generates an index node for an attribute in a graph database, wherein the index node is linked to a second node by a first edge having a first edge type. The Graph DBMS determines a first plurality of additional nodes that have the attribute. For each node of the first plurality of additional nodes, the graph DBMS generates an edge linking the node to the index node, wherein the edge comprises a second edge type.

Referring now to the figures, FIGS. 1-2, 4 and 6 are flow diagrams showing various methods for indexing contents of graph databases, in accordance with embodiments of the invention. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a computing device executing an indexing logic, such as indexing logic 852 of FIG. 8. The indexing logic 852 may be, for example, a component of a graph DBMS that manages a graph database.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Figure 1:
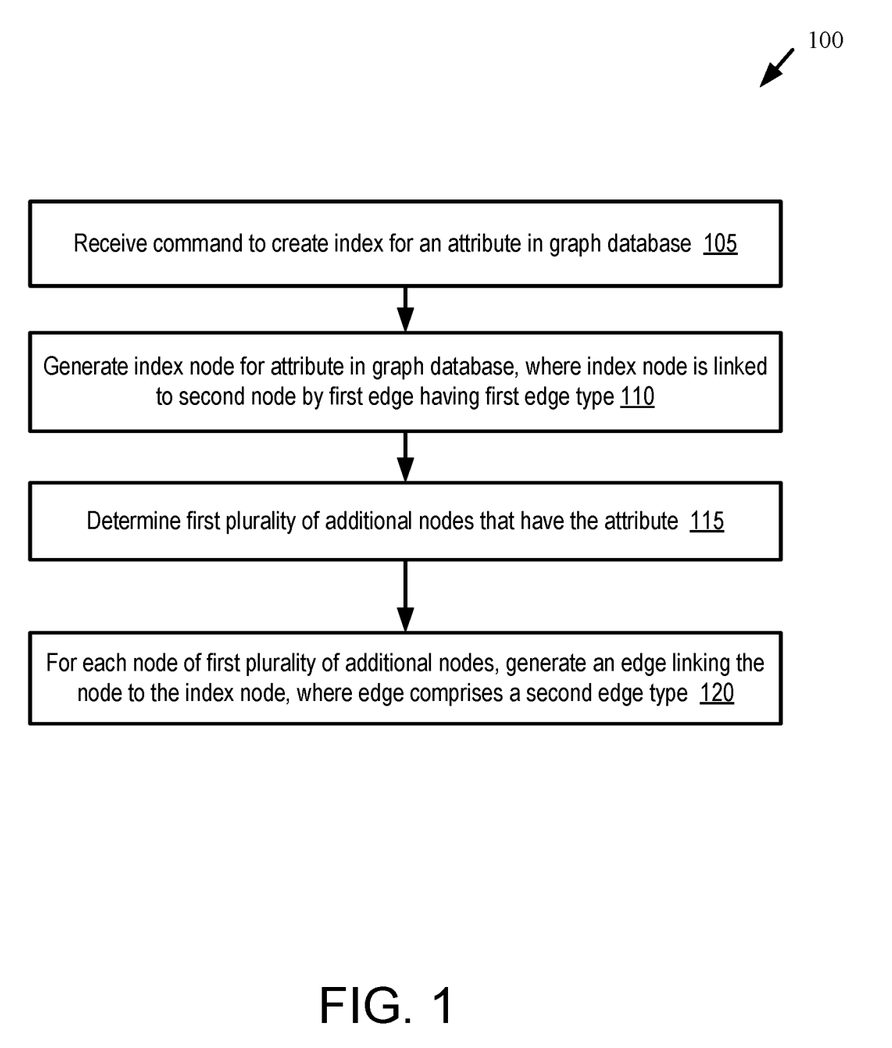
FIG. 1 is a flowchart illustrating one embodiment for a method of adding an index node to a graph database.

FIG. 1 is a flowchart illustrating one embodiment for a method 100 of adding an index node to a graph database. At block 105 of method 100, processing logic receives a command to create an index for an attribute in a graph database. The command may specify a single attribute or multiple attributes. One or more of the attributes may be specified as unique attributes. In such an instance, two different nodes may not have the same attribute value for the unique attribute. If two nodes do have the same attribute value, then an error may be generated. In one embodiment, the command is a create index API call that includes an index definition structure that describes the attribute (or attributes) of attached nodes (objects) that the index will track. As indicated, the definition may also indicate whether or not the index should enforce uniqueness. The result of the create index API call may be a node ID (also referred to as an object ID) that may be attached to the graph database 300 in the same manner as any other node. In one embodiment, nodes can be attached to the index node manually using an attach to index API call. The index may then automatically track the values of its defined attributes on each attached node.

The command received at block 105 may specify a second node that will be a source node for the index. The source node may provide an initial set of nodes to potentially include in the index. For example, children nodes of the source node, grandchildren nodes of the source node, and so on may be potential nodes to include in the index. The command may additionally include one or more additional constraints on the nodes to include in the index. These constraints may be based on node type, based on edge type, based on additional metadata associated with nodes and/or edges, and/or based on other data.

At block 110, processing logic generates an index node for the attribute in the graph database. The index node may have an index node type. The index node is linked to the second node by an edge. The edge may have a first edge type such as a parent-child (or simply child) edge type, a policy edge type, or a typed edge type. The various edge types are described in greater detail below. In one embodiment, the index node includes an ordered list of attributes. In one embodiment, the index node includes an ordered list of unique attributes followed by an ordered list of non-unique attributes. An index node may additionally include a set of attribute name plus attribute value pairs in an embodiment.

At block 115, processing logic determines a first plurality of additional nodes that have the attribute. The first plurality of nodes may be the child nodes, grandchild nodes, etc. of the second node. The first plurality of nodes may additionally include additional nodes that are not child nodes, grandchild nodes etc. of the second node. Additionally, the first plurality of nodes may exclude some of the child nodes, grandchild nodes, etc. of the second node in accordance with any constraints included in the command.

At block 120, for each node of the first plurality of nodes, processing logic generates an edge linking that node to the index node. In one embodiment, the edge linking an indexed node to an index node is assigned a second edge type that is different from the first edge type. In one embodiment, the second edge type is an index edge type. The index edge type indicates that the relationship between the index node and the indexed node is an indexing relationship. In one embodiment, the edge linking an indexed node to the index node includes an attribute label based on the attribute (or attributes) indexed by the index node and further includes an attribute value that corresponds to the attribute value (or attribute values) of the indexed node that are used by the index node to index the indexed node.

Figure 2:
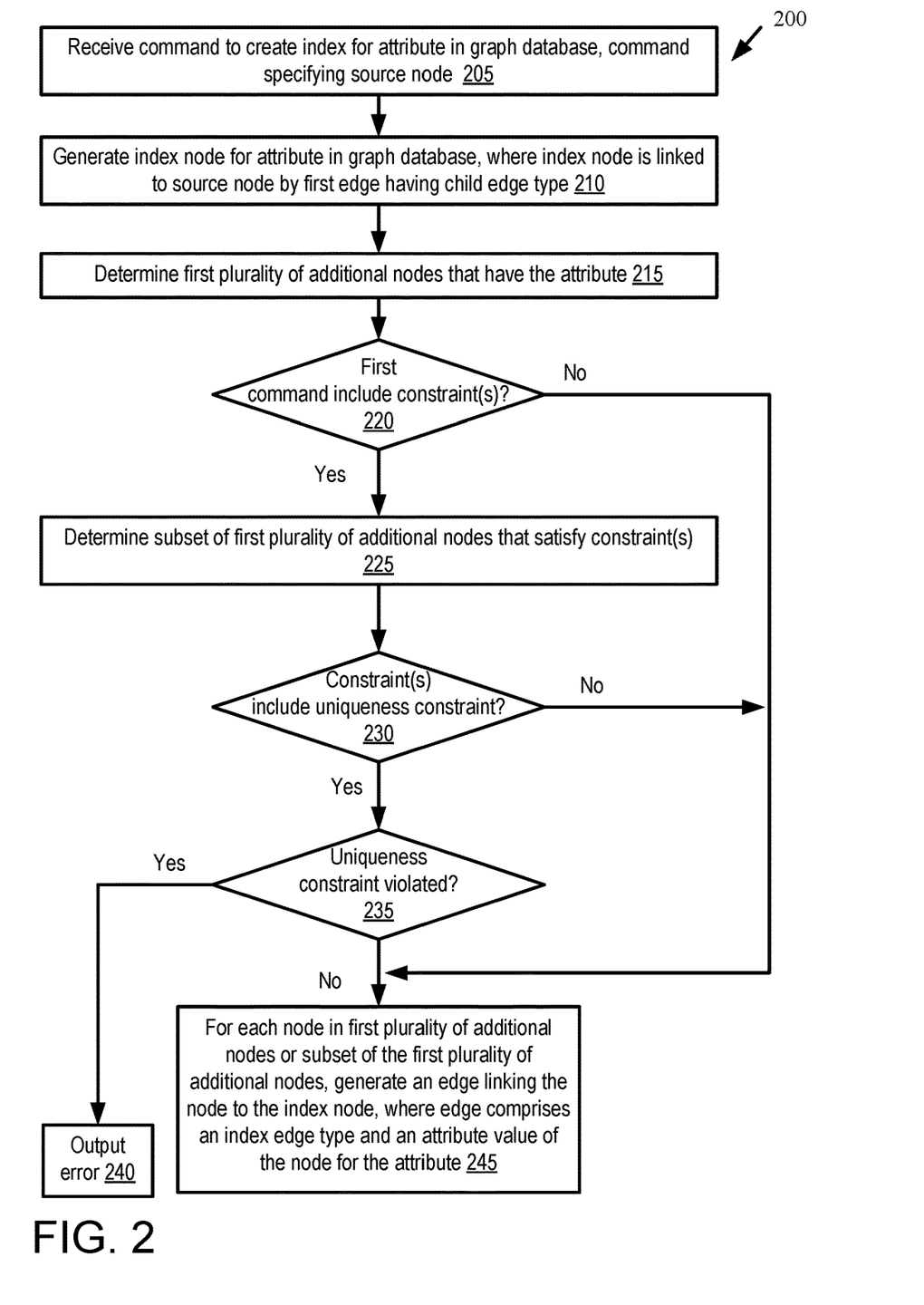
FIG. 2 is a flowchart illustrating one embodiment for a method of adding an index node to a graph database.

FIG. 2 is a flowchart illustrating one embodiment for a method 200 of adding an index node to a graph database. At block 205 of method 200, processing logic receives a command to create an index for an attribute in a graph database. The command may specify a node to be used as a source node for an index node that will comprise the index. The source node may provide an initial set of nodes to potentially include in the index. For example, children nodes of the source node, grandchildren nodes of the source node, and so on may be potential nodes to include in the index. The command may specify a single attribute or multiple attributes. One or more of the attributes may be specified as unique attributes. In one embodiment, the command specifies multiple source nodes for the index node.

At block 210, processing logic generates an index node for the attribute in the graph database. The index node is linked to the source node by a first edge having a parent-child (or simply child) edge type. The parent-child edge type may be used to navigate the graph database using standard graph navigation commands. If multiple source nodes were specified for the index node, then the index node is linked to each of the source nodes by an edge having the parent-child edge type.

At block 215, processing logic determines a first plurality of additional nodes that have the attribute. The first plurality of additional nodes may be associated with the source node (or source nodes) in some way. In one embodiment, the first plurality of additional nodes are or include child nodes of the source node or source nodes. In one embodiment, the first plurality of additional nodes are or include grandchild nodes of the source node(s), great grandchild nodes of the source node(s), and so on. In one embodiment, the first plurality of additional nodes further includes one or more nodes specified in the command to create the index. These additional nodes may or may not be related to the source node. For example, these additional nodes may include nodes that are children of a different node than the source node.

The command to create the index may additionally include one or more constraints on the nodes to include in the index. These constraints may be based on node type, based on edge type, based on additional metadata associated with nodes and/or edges, based on facets, and/or based on other data. In one embodiment, nodes are assigned node types. Node types may be user defined and/or may be predefined node types, such as an index node type and a directory node type. A node type constraint may limit an index to nodes of a particular type, which may then be indexed on one or more attributes. Objects may also have one or more facets, and may be indexed based on facets in addition to or instead of attributes. Some examples of constraints include a constraint to index only child nodes of a source node, a constraint to index only grandchild nodes of a source node, a restraint to index a particular branch of the graph database, and so on. Facets are described in greater detail below.

If the command to create the index included any constraints, then the method continues to block 225. If the command to create the index did not include any constraints, then the method proceeds to block 245.

At block 225, processing logic determines a subset of the first plurality of additional nodes that satisfy the one or more constraints. At block 230, processing logic determines whether one of the included constraints was a uniqueness constraint. A uniqueness constraint may be associated with a particular attribute being indexed, and may specify that no two indexed nodes may have the same attribute value. If at block 230 it is determined that the one or more constraints included a uniqueness constraint, then the method proceeds to block 235. If at block 230 it is determined that the one or more constraints do not include a uniqueness constraint, then the method proceeds to block 245.

At block 235, processing logic determines whether the uniqueness constraint is violated. The uniqueness constraint is violated if two nodes have the same attribute value for an attribute designated by the uniqueness constraint. If the uniqueness constraint is violated, the method proceeds to block 240 and an error is output. If the uniqueness constraint is not violated, then the method continues to block 245.

At block 245, processing logic connects the subset of the plurality of additional nodes that satisfied the one or more constraints to the index node. For each node in the first plurality of additional nodes that satisfied the one or more constraints (or for each node in the first plurality of nodes if there were no constraints), processing logic generates an edge linking the node to the index node. The node may be linked to the index node by an edge having an index edge type. The index edge type may specify a relationship between the index node and the indexed node as an indexing relationship. The edge between an indexed node and the index node may further include an attribute label that indicates an attribute (or multiple attributes) used by the index node to index the indexed node. The edge may further include an attribute value of each of the one or more attributes on which the indexed node was indexed.

The generated index node may include a list or other arrangement of indexed nodes and associated attributes and/or attribute values of the attributes on which those nodes were indexed. In one embodiment, if an indexed node does not have a value for the indexed attribute, then a null value may be assigned to the entry for that node. This may enable a search to be performed on the attribute for nodes that have the null value to identify nodes that are missing data.

In one embodiment, the index node is also a directory node. In such an embodiment, the node may have an index facet and a directory facet. In accordance with the index facet, the index node may have child nodes that are connected to the index node by edges having a child edge type. In one embodiment, processing logic further determines a plurality of nodes that are to be child nodes of the directory facet of the node that has the index facet and the directory facet. For each of the plurality of nodes, processing logic may generate an edge linking that node to the node with the index facet and the directory facet, where the edge has the child edge type.

Figure 3:
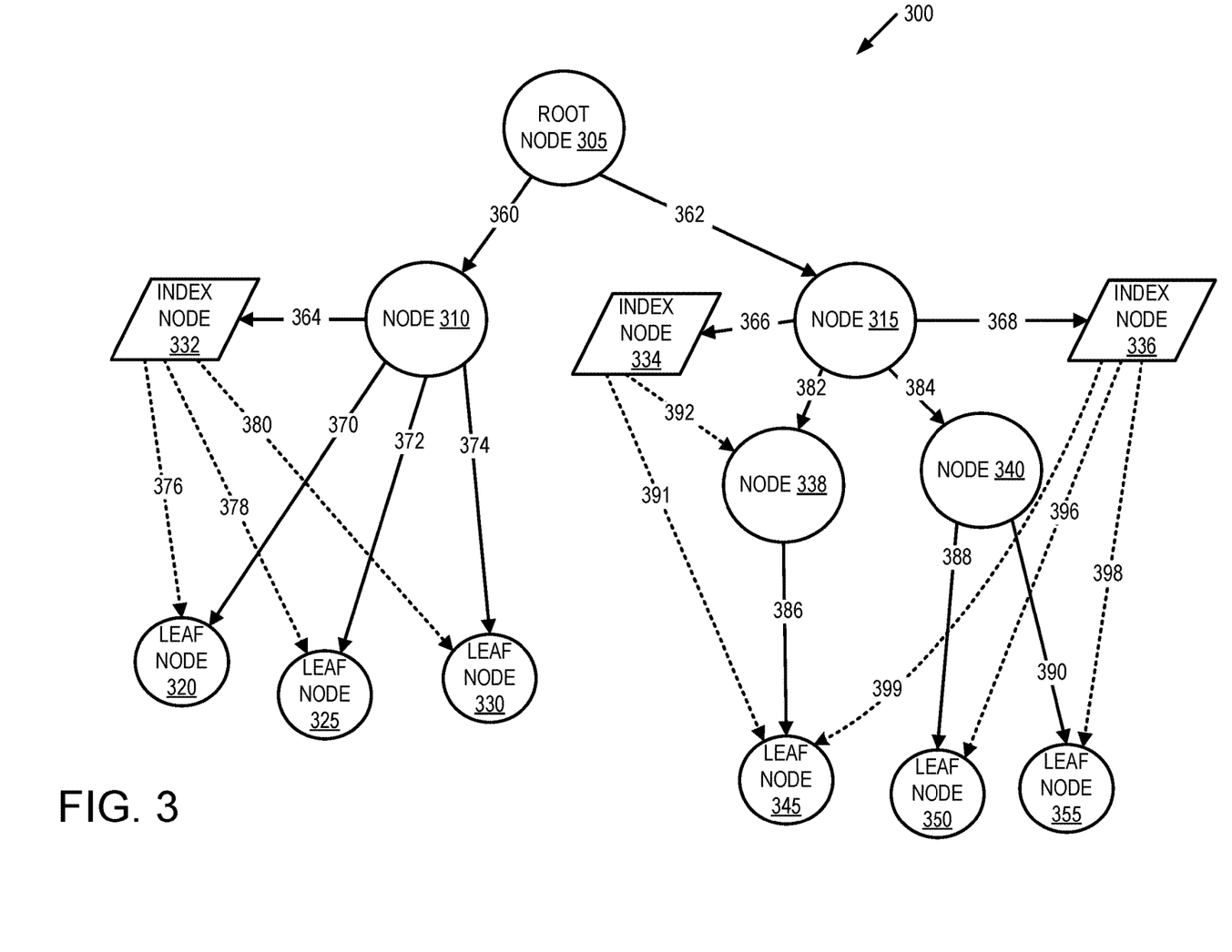
FIG. 3 illustrates an example graph database that includes an index node, in accordance with one embodiment of the present disclosure.

FIG. 3 illustrates an example graph database 300 that includes multiple index nodes, in accordance with one embodiment of the present disclosure. The graph database 300 includes a root node 305 connected to node 310 by edge 360 and to node 315 by edge 362. In one embodiment, the root node 305 is the top node in a directory that is used to organize parent and child nodes in a hierarchy. The graph database 300 further includes leaf node 320 linked to node 310 by edge 370, leaf node 325 linked to node 310 by edge 372 and leaf node 330 linked to node 310 by edge 374. A leaf node is a node that has no children. A leaf node may or may not be connected to a parent node. The graph database 300 further includes node 338 linked to node 315 by edge 382 and node 340 linked to node 315 by edge 384. The graph database 300 further includes leaf node 345 linked to node 338 by edge 386 as well as leaf node 350 linked to node 340 by edge 388 and leaf node 355 linked to node 340 by edge 390. Edges 360, 362, 370, 372, 374, 382, 384, 386, 388 and 390 may all have a parent-child edge type. While only a single edge is shown between any two nodes, two nodes may be connected by multiple edges. These edges may have the same edge type with different labels or may have different edge types.

Graph database 300 further includes three index nodes, including index node 332, index node 334 and index node 336. Node 310 is a source node of index node 332 and is linked to index node 332 by edge 364. Node 315 is a source node of index node 334 and is linked to index node 334 by edge 366. Node 315 is also a source node of index node 336 and is linked to index node 336 by edge 368. Edges 364, 366 and 368 may each have a parent-child edge type.

In one embodiment, each node in the graph database 300 may be a structured data entity (e.g., an object) in a directory. A node may include attributes about a physical and/or logical entity (e.g., for the purpose of information discovery and enforcement policies). For example, users, devices, applications, accounts, virtual machine instances, etc. can all be represented by nodes in the graph database 300. Each node may have a node identifier (ID) that uniquely identifies that node in the graph database 300. Each node may additionally have a node type. Examples of node types include an index node type, a directory node type, a policy node type, and so on. A node with a policy node type may contain permissions and/or capabilities. A node with a directory node type may contain directory information. A node with an index node type may be an index for the graph database 300. An index node (node having an index edge type) may be maintained as an edge list in one embodiment.

In one embodiment, nodes may have multiple different node types. For example, a single node may have an index node type and a directory node type. This enables the single node to act both as a directory node and as an index node. In one embodiment, a node may have one or more facets. A facet may be a collection of attributes, constraints and/or edges defined within a schema. For example, person and device may be facets to define corporate employees with association to multiple devices. Facets may be used to enable a node to include both the index node type (which may be represented as an index facet) and a directory node type (which may be represented as a directory facet) and/or a policy node type (which may be represented as a policy facet).

Index node 332 contains an index of leaf nodes 320, 325 and 330. Accordingly, index node 332 is linked to leaf node 320 by edge 320, is linked to leaf node 325 by edge 378, and is linked to leaf node 330 by edge 380. Edges 376, 378 and 380 each have index edge types. Notably, index node 332 has indexed all of the leaf nodes that are children of node 310.

Index node 334 contains an index of leaf node 345 as well as node 338. Accordingly, index node 334 is linked to leaf node 386 by edge 391 and is linked to node 338 by edge 392. Edges 391, 392 each have index edge types. Notably, index node 334 has indexed a branch of node 315 (e.g., node 388 and all of the nodes linked to node 388, the children of node 388, the grandchildren of node 388, and so on.

Index node 336 contains an index of leaf node 350 as well as leaf node 355 and leaf node 345. Accordingly, index node 336 is linked to leaf node 350 by edge 396, to leaf node 345 by edge 399, and to leaf node 355 by edge 398. Edges 396, 398 and 399 each have index edge types. Notably, index node 336 has indexed all of the grandchild nodes of node 315.

In one embodiment, edges are directed edges that define a relationship between two nodes. In one embodiment, each edge may have an edge type. Examples of edge types include a policy edge type, an parent-child edge type (or simply child edge type), an index edge type, an attachment edge type, and a typed edge type. A child edge type may create a parent-child relationship between nodes that it connects, wherein the child edge may be directed from the parent node to the child node. An attachment edge type may be an edge type used to link a leaf node having a policy node type to another node. A typed edge type may model an administrator defined relationship between two nodes (e.g., an ownership relationship). An index edge type provides rich information lookup based on an index node and defined indexed attributes, thus enabling fast tree traversals and searches within directory trees.

An index node may be linked to an indexed node by multiple edges having the index edge type. Each such edge may contain a different attribute label and/or a different attribute value. This may enable an index node to index other nodes using multiple different attributes.

As shown, the indexing of graph database 300 is very flexible, and allows for multiple different indexing scenarios. A few indexing scenarios are illustrated, such as indexing of child nodes of a source node by index node 332, indexing of a branch of the graph database 300 by index node 334 and indexing of the grandchild nodes of a source node by index node 336. Many other indexing schemes are also possible using the indexing system described herein.

In an example, an administrator may define a new attribute that will act as externally viewable identifiers for leaf nodes 320, 325 and 330. Each of these nodes may be assigned attribute values for the new attribute, where each attribute value corresponds to a distinct externally viewable identifier. The index node 332 may index the leaf nodes 320, 325, 330 of the graph database by the new attribute that acts as the externally viewable identifier. The index node 332 may be exposed as a well-known node that users can start from and/or navigate to.

A user may then use the index node 332 to view the externally viewable attributes of each of the leaf nodes 320, 325 330. Since the index node 332 is attached to each of the nodes by edges 376, 378, 380 having the index edge type, the user may then navigate to and access a leaf node 320, 325, 330 having a target externally viewable identifier via the edge between the index node 332 and the associated indexed node. This enables an administrator to build a unique identifier scheme and build an index of a subset of the graph database 300 in a manner that exposes the leaf nodes 320, 325, 330 based on their external identifiers. Accordingly, a user may pass in an external identifier as a part of a path to a node to enable the graph DBMS to traverse through the index node 332 to the desired leaf node 320, 325, 330 via an appropriate edge 376, 378, 380. For example, a DBMS may navigate to an index node, and may then receive a query comprising an attribute value at an index node. The VBMS may determine a particular edge connected to the index node, where the particular edge has the index type and the attribute value included in the query. The DBMS may then generate a result to the query, where the result comprises a in indication of a path to a particular node linked to the index node by a particular edge. The DBMS may then receive a command to navigate to the particular node from the index node using the received path. Once the graph DBMS has navigated to a node, it may read information from the node, modify information in the node, and so on.

In one embodiment, in addition to the index nodes shown an additional index node may be linked to root node 305, where root node 305 may act as the source node for the index node. The index attached to the root node 305 may be connected to the root node 305 by a well-known edge. A well-known edge may be an edge that is exposed, and a well-known node may be a node that is exposed. The index attached to the root node may then be used to expose external identifiers to be used for traversing the graph database and navigating to desired nodes, as explained in the example above.

In one embodiment, any of the aforementioned indexes of the graph database 300 may be used as a scratch graph for the graph database and/or a portion of the graph database 300. The scratch graph may be set up and then tested by traversing the graph database 300 using the scratch graph. If the scratch graph is acceptable, the scratch graph may then be swapped with the production graph (e.g., the nodes and edges of the graph database 300 other than the index nodes and index edges). The swap may be performed by changing the node type of an index node into a node type of a directory node as well as changing the edge types of edges connected to the index node into parent-child edge types. Concurrently, the directory node that served as a source node to the index node may be converted from a directory type to an index type or may be deleted. For each of the nodes that were connected to the index node by index edge types, these nodes may also have been connected, for example, to the source node of the index node by edges having parent-child edge types. These edges having parent-child edge types may be converted to edges having index edge types or may be deleted.

In an example, index node 332 and edges 376, 378, 380 may act as a scratch graph, while node 310 and edges 370, 372, 374 may be components of a production graph. The index node 332 and edges 376, 378, 380 may be converted into components of the production graph by converting index node 332 to a directory node type and converting edges 376, 378 and 380 into parent-child edge types. Additionally, node 310 may be converted from a directory node type to an index node type (or may be deleted), and edges 370, 372, 374 may be converted to index edge types (or deleted). The conversion of the index node 332 and edges 376, 378, 380 may be performed atomically with the conversion of node 310 and edges 370, 372 and 374. Additionally, the index node 332 may become a source node for node 310, and edge 360 may be updated to connect root node 360 to index node 332.

In one embodiment, the graph database 300 may include an aggregating node under the root node 305. The aggregating node may then include links to many other nodes. The aggregating node may be used as a source node for an index node, which may then index some or all of the nodes connected to the aggregating node.

Though not shown, the graph database may also include one or more compound indexes. A compound index may be an index that is connected to another index by an edge. In a compound index, one index may be indexed by another index. The edge or edges linking the two indexes may have index edge types.

A user may use standard operations to navigate the graph database to any of the index nodes. For example, the user may follow a path from the root node to a child node, and from the child node to one of the index nodes. The user may then issue a search of the index node for a particular attribute value of an attribute used by that index node to index other nodes. In one embodiment, indexes are used to search for objects using an efficient enumeration. For example, a call to a list index API may be made along with an indication of a range of values to be searched for in the index.

In an example, an index node may index other nodes based on the employee facet. Then instead of searching across all user objects (nodes) in the directory, a user can search only the user objects that content an employee facet.

Figure 4:
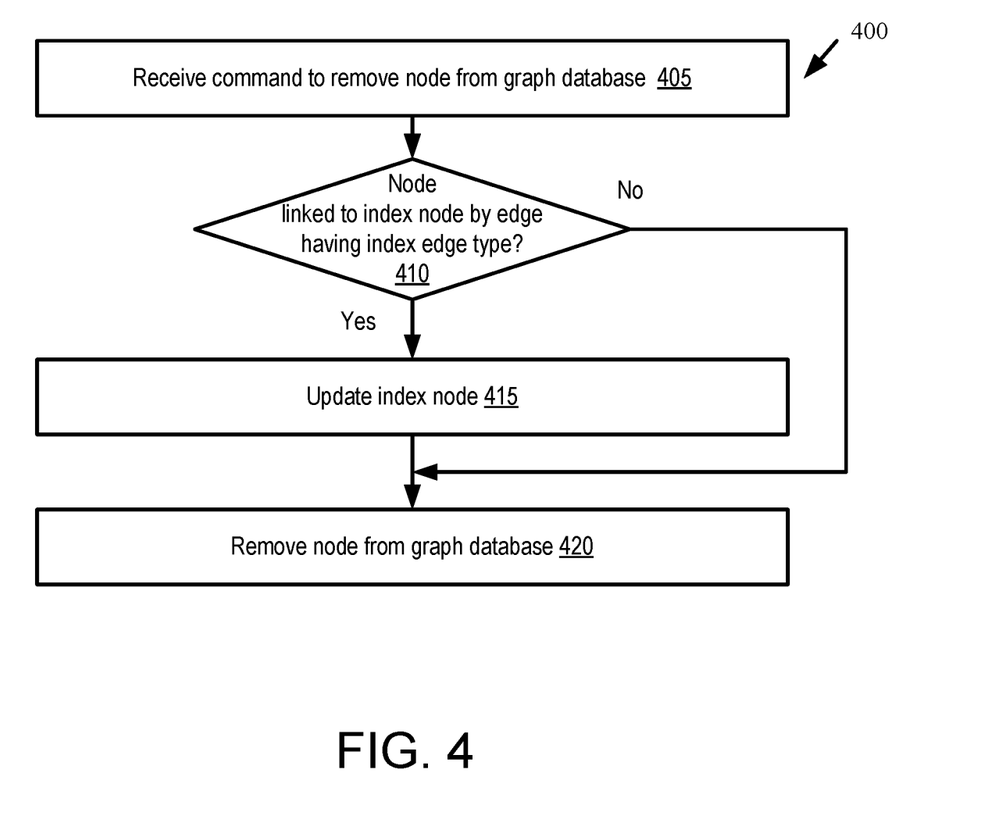
FIG. 4 is a flowchart illustrating one embodiment for a method of removing an indexed node from a graph database.

FIG. 4 is a flowchart illustrating one embodiment for a method 400 of removing an indexed node from a graph database. At block 405 of method 400, processing logic receives a command to remove (detach) a node from the graph database. At block 410, processing logic determines whether the node is linked to an index node by an edge having an edge type. This may be performed by reviewing the edges attached to the node to remove and/or by following such edges to one or more index nodes and reviewing those index nodes to identify an entry for the node to be removed. If the node is linked to an index node, the method continues to block 415. Otherwise the method proceeds to block 420.

At block 415, processing logic updates the index node. In one embodiment, the index node is updated by removing an entry for the node to be detached from the index node. An edge linking the index node to the node to be detached may also be removed. In one embodiment, the index node does not include entries of indexed nodes. Accordingly, in one embodiment no entries are removed from the index node. At block 420, the node that was identified at block 405 is removed or detached from the graph database. In one embodiment, the operations of blocks 415 and 420 are performed atomically as a transaction so that either all of the operations occur or none of the operations occur.

Figure 5:
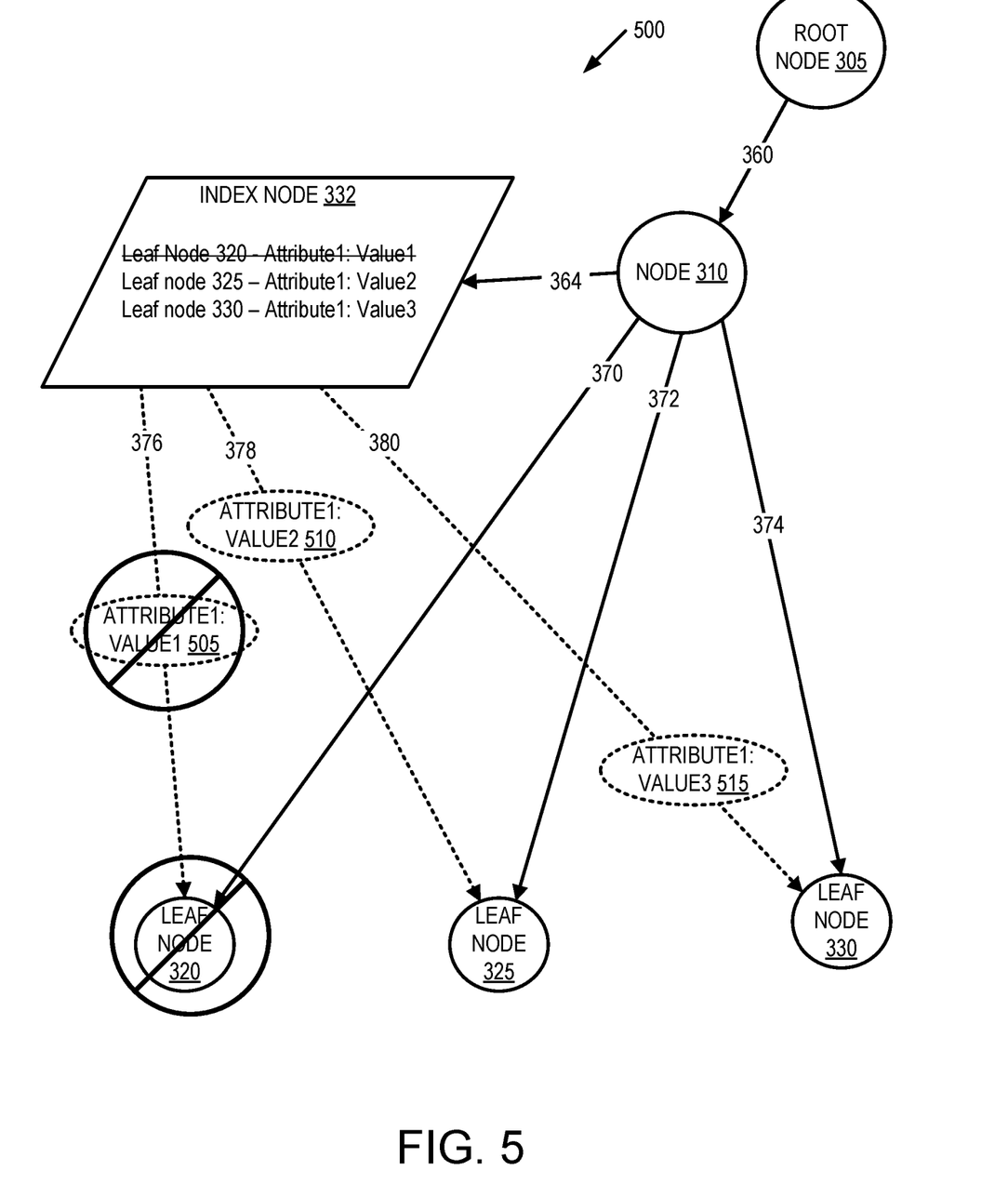
FIG. 5 illustrates removal of an indexed node from an example graph database, in accordance with one embodiment of the present disclosure.

FIG. 5 illustrates a portion of an example graph database 500 showing removal of an indexed node from the example graph database 500, in accordance with one embodiment of the present disclosure. As shown, the portion of the graph database 500 includes root node 305, node 310, leaf nodes 320, 325 and 330, index node 332 and edges 360, 364, 370, 372, 374, 376, 378, and 380, similar to example graph database 300. As shown, index node 332 indexes the leaf nodes on "attribute1". Edge 376 has a label 505 that includes attribute1 and an attribute value of value1. Edge 378 has a label 510 that includes attribute1 and a value of value2. Edge 380 has a label 515 that includes attribute1 and a value of value3. In one embodiment, index node 332 includes a first entry for leaf node 320, a second entry for leaf node 325 and a third entry for leaf node 330. The first entry has a key value pair of attribute1:value1, the second entry has a key value pair of attribute1:value2, and the third entry has a key value pair of attribute1:value3. As shown, leaf node 320 is detached from the graph database 500, and so edge 376 is also removed and index node 332 is edited to remove the first entry for leaf node 320. In one embodiment, index node 332 does not include entries for indexed nodes.

In the illustrated example, the index node 332 includes a list of indexed nodes and associated key value pairs for the attribute on which the indexed nodes are indexed. However, in one embodiment the index node 332 does not include a list of indexed nodes (e.g., does not include entries for indexed nodes). In one embodiment, the edges connecting the index node 332 to indexed nodes may function as a list of indexed nodes and their associated key value pairs.

Figure 6:
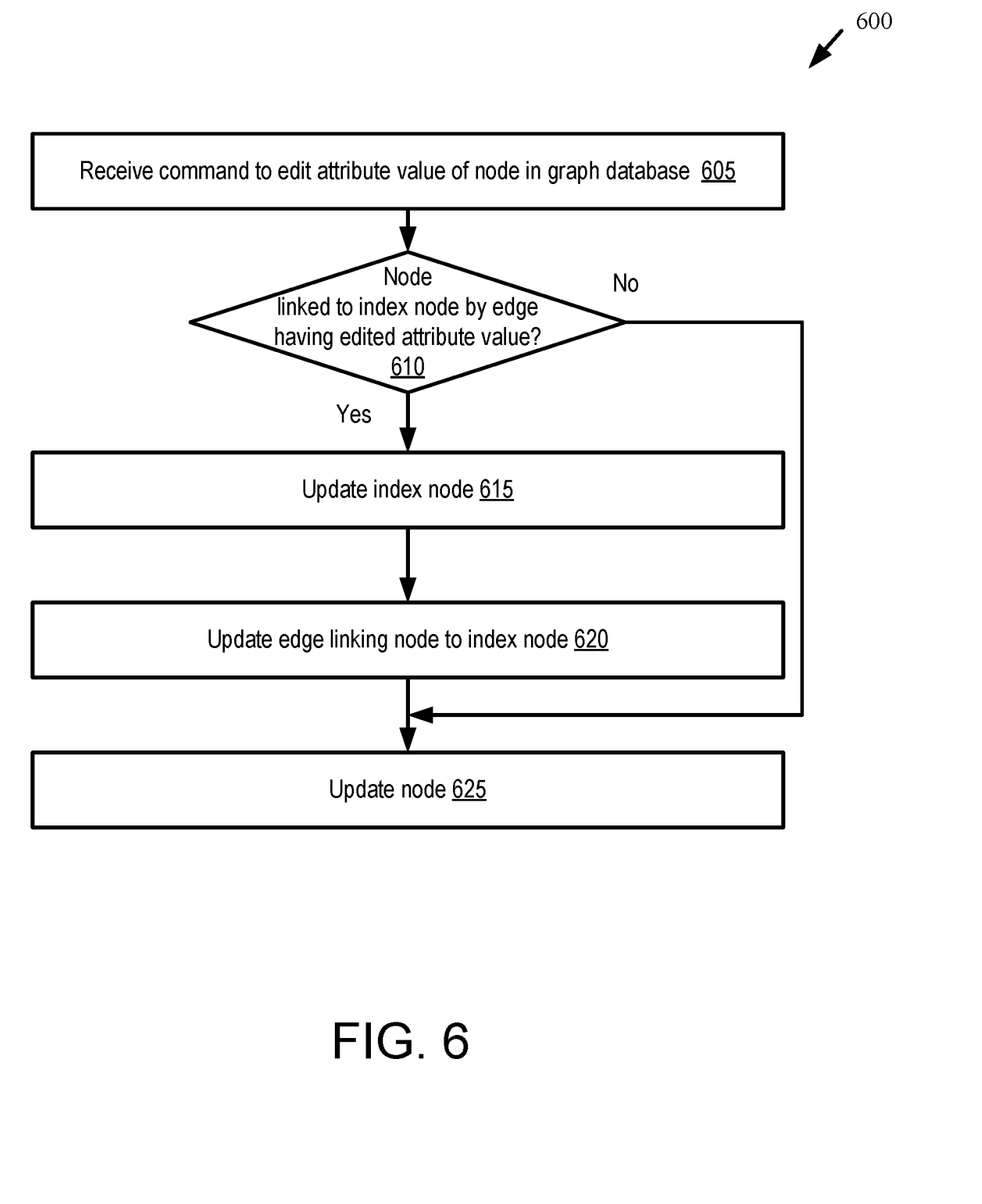
FIG. 6 is a flowchart illustrating one embodiment for a method of updating an indexed node in a graph database.

FIG. 6 is a flowchart illustrating one embodiment for a method 600 of updating an indexed node in a graph database. At block 605 of method 600, processing logic receives a command to edit an attribute value of a node in a graph database. At block 610, processing logic determines whether the node is linked to an index node by an edge having an edited attribute value. This may be performed by reviewing the edges attached to the node to edit and/or by following such edges to one or more index nodes and reviewing those index nodes to identify an entry for the node to be edited. If the node is linked to an index node by an edge having a label with the edited attribute, the method continues to block 615. Otherwise the method proceeds to block 625.

At block 615, processing logic updates. In one embodiment, the index node is updated by updating the entry for the edited node in the index node. The entry may be updated by replacing the original value for the attribute with the new value for the attribute. In one embodiment, the index node is updated by updating the edge connecting the index node to the indexed node. At block 620, processing logic updates the edge linking the node to the index node. The edge is updated by changing the label for the edge to include the new attribute value rather than the original attribute value. In one embodiment, the operations of block 615 and block 620 are combined.

At block 625, the node is updated. In one embodiment, the operations of blocks 615, 620 and/or 625 are performed atomically as a transaction so that either all of the operations occur or none of the operations occur.

Figure 7:
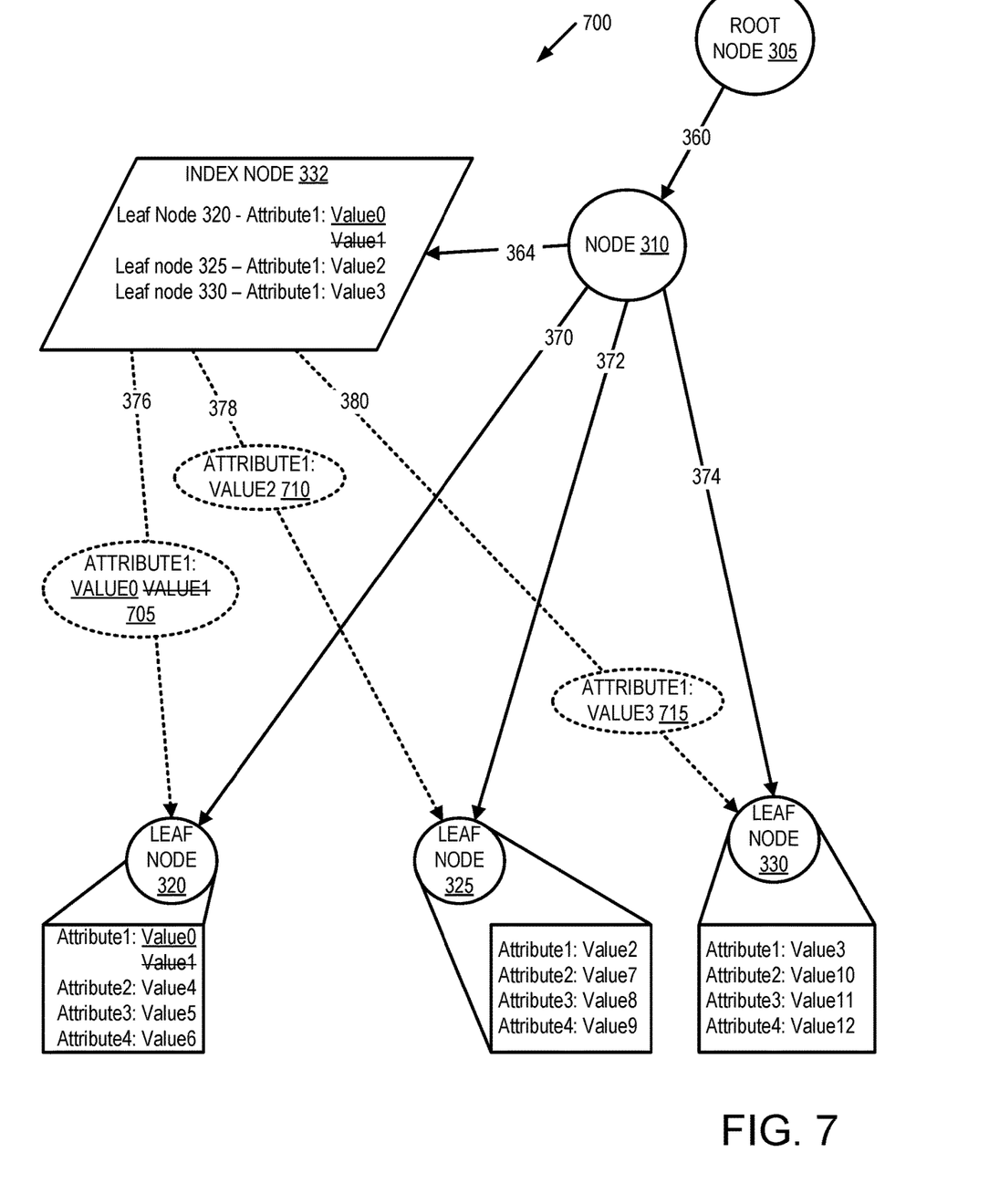
FIG. 7 illustrates an update to an indexed node in an example graph database, in accordance with one embodiment of the present disclosure.

FIG. 7 illustrates an update to an indexed node in an example portion of a graph database 700, in accordance with one embodiment of the present disclosure. As shown, the portion of the graph database 700 includes root node 305, node 310, leaf nodes 320, 325 and 330, index node 332 and edges 360, 364, 370, 372, 374, 376, 378, and 380, similar to example graph database 300. As shown, index node 332 indexes the leaf nodes on "attribute1". Edge 376 has a label 705 that includes attribute1. Edge 376 originally included value1 for attribute1, but was updated to include value0 for attribute1. Edge 378 has a label 710 that includes attribute1 and a value of value2. Edge 380 has a label 715 that includes attribute1 and a value of value3. Leaf node 320 was edited to update the value for attribute1 from value1 to value0.

In one embodiment, index node 332 includes a first entry for leaf node 320, a second entry for leaf node 325 and a third entry for leaf node 330. The first entry originally had a key value pair of attribute1:value1, but was updated to have the key value pair attribute1:value0. The second entry has a key value pair of attribute1:value2. The third entry has a key value pair of attribute1:value3. Leaf node 320 includes attribute1, attribute2, attribute3 and attribute4.

In one embodiment, the index node 332 does not include entries for indexed nodes. In one embodiment, the edges connecting the index node 332 to indexed nodes may function as a list of indexed nodes and their associated key value pairs. Accordingly, in one embodiment edge 705 is updated and leaf node 320 is updated, but no changes are made to index node 332 in response to a command to change an attribute value of leaf node 320.

The operations to update the leaf node 320, the edge 376 and/or the index node 332 may be performed atomically in one embodiment.

Figure 8:
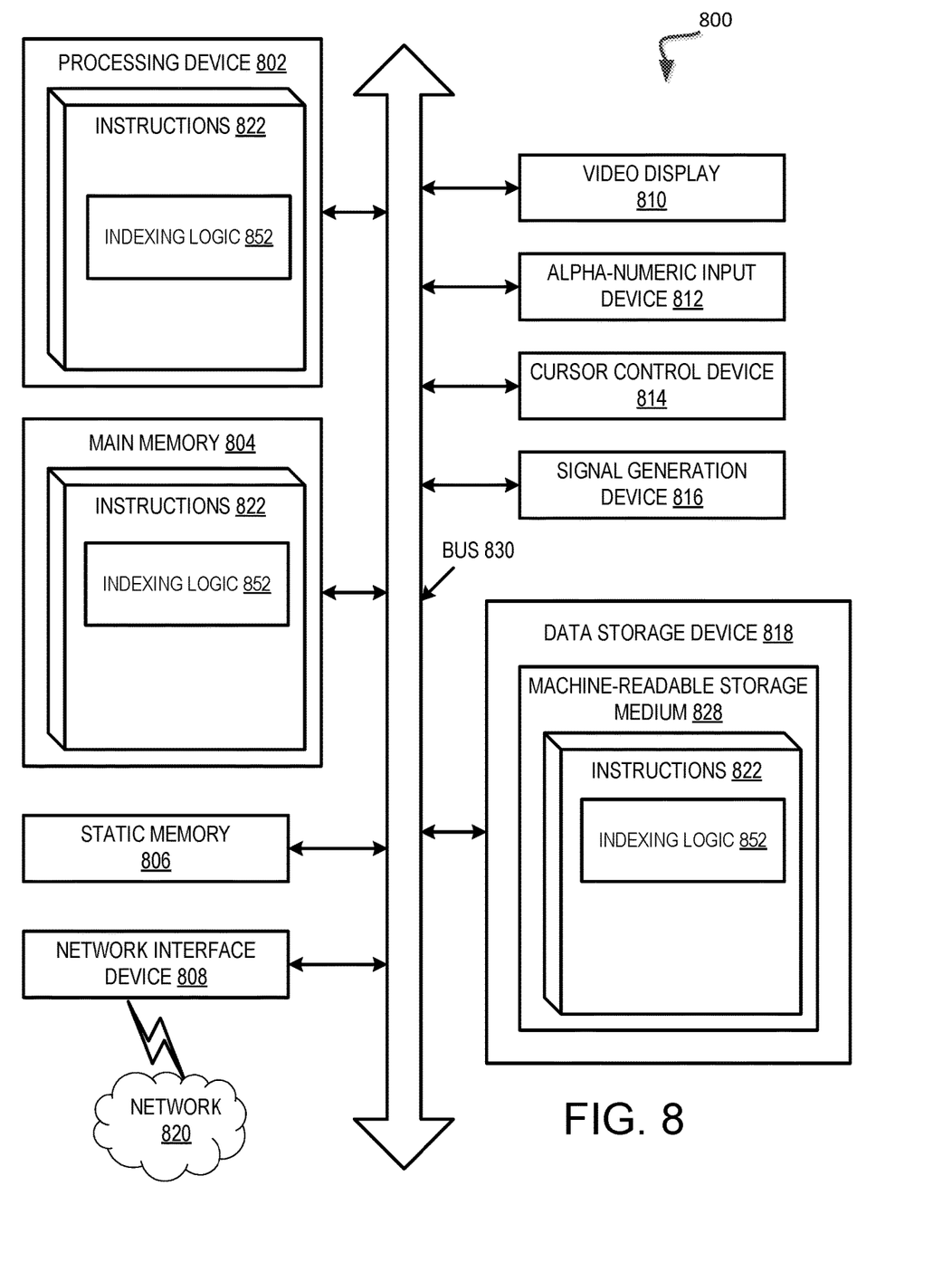
FIG. 8 is a schematic block diagram that provides one example illustration of a computing device executing an indexing logic, according to one embodiment of the present disclosure.

FIG. 8 illustrates a diagrammatic representation of a machine in the exemplary form of a computer system 800 within which a set of instructions, for causing the machine to perform any one or more of the methodologies discussed herein, may be executed. The system 800 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, a switch or bridge, a mobile phone, a smart phone, a laptop computer, a tablet computer, a netbook, a notebook, a desktop computer, a gaming console, a server computer (e.g., a rackmount server), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The server computing devices may include physical machines and/or virtual machines hosted by physical machines. The physical machines may be rackmount servers, desktop computers, or other computing devices. In one embodiment, the server computing devices include virtual machines managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. If multiple computing devices are used, then the computing devices may be connected via a network (e.g., a local area network (LAN), wide area network (WAN), wireless network, intranet, the Internet, or a combination thereof), a direct wired connection (e.g., via an Ethernet connection, a universal serial bus (USB) connection, a Firewire connection, a Lightning connector, a peripheral component interconnect express (PCIe) connection, a serial connection, a small computer system interface (SCSI) connection, or a wireless connection (e.g., a Bluetooth® connection, a ZigBee® connection, etc.).

The exemplary computer system 800 includes a processing device (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute instructions for a indexing logic 852 for performing the operations discussed herein. In one embodiment, indexing logic 852 is a component of a graph DBMS.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable storage medium 828 on which is stored one or more sets of instructions of the dataset suitability tester 852 embodying any one or more of the methodologies or functions described herein. The instructions may also reside, completely or at least partially, within the main memory 804 and/or within processing logic of the processing device 802 during execution thereof by the computer system 800, the main memory 804 and the processing device 802 also constituting computer-readable media.

The instructions may further be transmitted or received over a network 820 via the network interface device 808. While the computer-readable storage medium 828 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any non-transitory computer-readable medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention. In the above description, numerous details are set forth.

It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "determining", "computing", "performing", "discarding", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method comprising:
    receiving, by a processing device, a first command to create a first index for a graph database, the first command identifying a first attribute to include in the first index;
    generating a first index node associated with the first attribute in the graph database;
    determining a first set of indexed nodes in the graph database that have the first attribute, wherein the first index node comprises first information identifying the first attribute and an attribute value for each of the first set of indexed nodes;
    for each indexed node of the first set of indexed nodes, generating a corresponding first edge comprising an index edge type indicating a relationship between the first index node and each indexed node and the attribute value for the first attribute of each indexed node of the first set of indexed nodes;
    receiving a second command to create a second index for the graph database, the second command comprising a second attribute;
    in response to the second command, generating a second index node in the graph database;
    determining a second set of indexed nodes that have the second attribute, wherein the second index node comprises second information identifying the second attribute and an attribute value for each of the second set of indexed nodes;
    receiving, at the first index node, a query to identify a target node comprising a first attribute value of the first attribute;
    identifying a particular edge connected to the first index node, the particular edge having a first index edge type and the first attribute value; and
    generating a result to the query, the result comprising an indication of a path to the target node linked to the first index node by the particular edge.

2. The computer implemented method of claim 1, further comprising:
    receiving a second command to remove a particular node of the first set of indexed nodes from the graph database;
    determining that the particular node is linked to the first index node by an edge having the first index edge type;
    removing the particular node from the graph database; and
    updating the first index node to reflect deletion of the particular node, wherein the removing and the updating are performed as a transaction.

3. The computer implemented method of claim 2, wherein the result further comprises a path from the first index node to the particular node, the method further comprising:
- navigating to the first index node; and
- navigating from the first index node to the particular node using the path.

4. The computer implemented method of claim 1, further comprising:
- receiving a third command to update the first attribute value of the target node to a second attribute value;
- determining that the first attribute value of the first attribute is included in the particular edge linking the target node to the first index node;
- updating the target node to include the second attribute value;
- updating the particular edge linking the target node to the first index node to include the second attribute value; and
- updating the first index node, wherein the updating of the target node, the updating of the particular edge, and the updating of the first index node are performed as a transaction.

5. A device comprising:
- a processing device; and
- a memory to store computer executable instructions that, if executed, cause the processing device to:
  - generate, in response to a first command, a first index node associated with a first attribute in a graph database;
  - determine a first set of indexed nodes that have the first attribute, wherein the first index node comprises first information identifying the first attribute and an attribute value for each of the first set of indexed nodes;
  - for each indexed node of the first set of indexed nodes, generate a corresponding first edge comprising an index edge type indicating a relationship between the first index node and each indexed node and the attribute value for the first attribute of each indexed node of the first set of indexed nodes;
  - generate, in response to a second command, a second index node for a second attribute in the graph database; and
  - determine a second set of indexed nodes that have the second attribute, wherein the second index node comprises second information identifying the second attribute and an attribute value for each of the second set of indexed nodes;
  - receive, at the first index node, a query to identify a target node comprising a first attribute value of the first attribute;
  - identify a particular edge connected to the first index node, the particular edge having a first index edge type and the first attribute value; and
  - generate a result to the query, the result comprising an indication of a path to the target node linked to the first index node by the particular edge.

6. The device of claim 5, wherein the processing device is further to:
- receive the first command to create a first index for the graph database, the first command comprising the first attribute to include in the first index.

7. The device of claim 6, wherein the first command comprises one or more constraints comprise a selection of the first set of indexed nodes of the graph database to include in the first index.

8. The device of claim 6, wherein the first command comprises a uniqueness constraint for the first attribute, and wherein the processing device is further to:
- determine that none of the first set of indexed nodes have a same attribute value for the first attribute.

9. The device of claim 6, wherein the first command comprises a constraint to index only direct children of the first set of indexed nodes.

10. The device of claim 6, wherein the first command comprises a constraint to index only a branch of the first set of indexed nodes.

11. The device of claim 5, wherein the first index node comprises an index node type and a directory node type, wherein the index node type is a first facet of the first index node and the directory node type is a second facet of the first index node, wherein the processing device is further to: determine a third set of indexed nodes to be child nodes of the first index node.

12. The device of claim 5, wherein the processing device is further to:
- receive a third command to remove a particular node of the first set of indexed nodes from the graph database;
- determine that the particular node is linked to the first index node by an edge having the index edge type;
- remove the particular node from the graph database; and
- update the first index node to reflect deletion of the particular node, wherein removal of the particular node and the update to the first index node are performed as a transaction.

13. The device of claim 5, wherein the result further comprises a path from the first index node to the target node, and wherein the processing device is further to:
- navigate to the first index node; and
- navigate from the first index node to the target node using the path.

14. The device of claim 5, wherein the processing device is further to:
- receive a third command to update the first attribute value of the target node to a second attribute value;
- determine that the first attribute value of the first attribute is included in the particular edge linking the target node to the first index node;
- update the target node to include the second attribute value;
- update the particular edge linking the target node to the first index node to include the second attribute value; and
- update the first index node, wherein the updating of the target node, the updating of the particular edge, and the updating of the first index node are performed as a transaction.

15. A non-transitory computer-readable storage device storing computer-executable instructions that, if executed by a processing device, cause the processing device to:
- generate, in response to a first command, a first index node associated with a first attribute in a graph database;
- determine a first set of indexed nodes that have the first attribute, wherein the first index node comprises first information identifying the first attribute and an attribute value for each of the first set of indexed nodes;
- for each indexed node of the first set of indexed nodes, generate a corresponding first edge comprising an index edge type indicating a relationship between the first index node and each indexed node and the attribute value for the first attribute of each indexed node of the first set of indexed nodes;

generate, in response to a second command, a second index node for a second attribute in the graph database; and determine a second set of indexed nodes that have the second attribute, wherein the second index node comprises second information identifying the second attribute and an attribute value for each of the second set of indexed nodes;

receive, at the first index node, a query to identify a target node comprising a first attribute value of the first attribute;

identify a particular edge connected to the first index node, the particular edge having a first index edge type and the first attribute value; and generate a result to the query, the result comprising an indication of a path to the target node linked to the first index node by the particular edge.

16. The non-transitory computer-readable storage device of claim 15, wherein the instructions, if executed by the processing device, further cause the processing device to:
receive the first command to create a first index for the graph database, the first command comprising the first attribute to include in the first index.

17. The non-transitory computer-readable storage device of claim 15, wherein the first index node comprises an index node type and a directory node type, wherein the index node type is a first facet of the first index node and the directory node type is a second facet of the first index node, the wherein the processing device is further to:
determine a third set of indexed nodes to be child nodes of the first index node.

* * * * *